Nov. 21, 1950  W. A. KIRSCH ET AL  2,530,973
TEMPERATURE MEASURING DEVICE
Filed Sept. 30, 1948
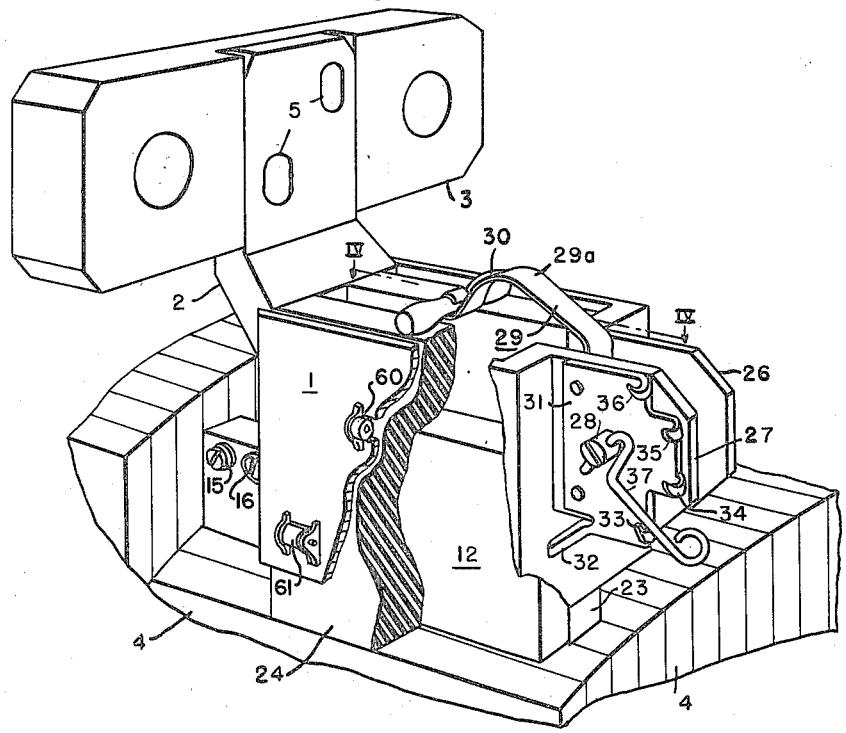
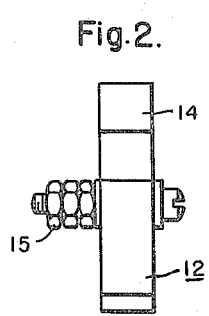
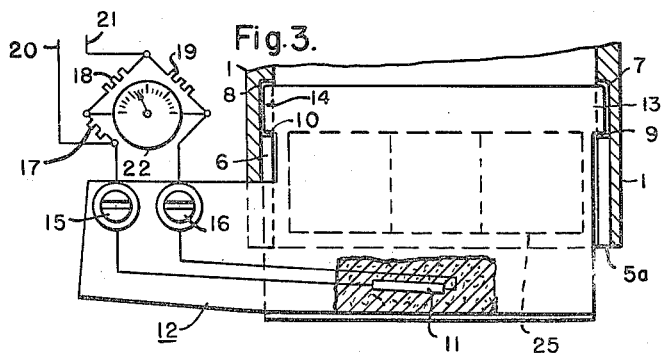
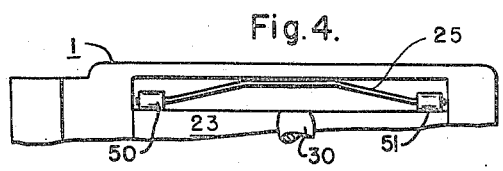
WITNESSES:
E. A. McCloskey.
Rw. C. Groome
INVENTORS
William A. Kirsch and
James G. Wilhite
BY
Paul E. Friedemann
ATTORNEY Patented Nov. 21, 1950

2,530,973

UNITED STATES PATENT OFFICE 2,530,973

TEMPERATURE MEASURING DEVICE

William A. Kirsch, East McKeesport, and James G. Wilhite, Pittsburgh, Pa., assignors to Westinghouse Electric Corporation, East Pittsburgh, Pa., a corporation of Pennsylvania Application September 30, 1948, Serial No. 52,044

17 Claims. (Cl. 73—351)

Our invention relates to temperature measuring devices and, more particularly, to the use of a material, having a high sensitivity to changes in temperature, mounted in a special structure for gaining information of the temperature of the commutator of a dynamo-electric machine.

There are many devices on the market which will either indicate or record changes in temperature as determined by temperature-responsive resistors. To indicate, or record, the temperature of a rotating commutator of a dynamo-electric machine thus becomes a problem of producing a suitable structure and mounting for a temperature-sensitive resistor, such that temperature indications are produced that follow reasonably accurately the actual temperatures of the rotating commutator of a dynamo-electric machine.

One broad object of our invention is the provision of a mounting structure for a temperature-sensitive resistor, or semi-conductor, such that the electric current variation produced in a circuit by the semi-conductor is a substantially true function of the temperature of the machine element being scanned by the temperature-sensitive element.

It is also an object of our invention to incorporate a temperature responsive resistor, a thermocouple, or a temperature-sensitive semi-conductor into a brush structure designed to be mounted in the brush holders similar to the conventional commutator brush holders.

Other objects and advantages of our invention will become more apparent from a study of the following specification and the accompanying drawing, in which:

Figure 1 is an end view, in perspective, of a brush holder of a dynamo-electric machine provided with the novel structure of our invention;

Fig. 2 is an end view of a melamine asbestos block housing a thermistor;

Fig. 3 is a broken-out part on a horizontal section plane showing how the melamine asbestos element, housing the thermistor, is mounted in the brush holder; and Fig. 4 is a plan view of the part broken away on the line IV—IV of Fig. 1.

In prior art practice to determine the temperature of a movable body, as a commutator, the temperature-sensitive device had to be secured to the rotating, or moving, part and the electric current changes produced collected through slip rings. Such apparatus is expensive, unreliable since the sliding contact losses are included in the indicating circuit, difficult to make adhere to the moving part, and produces rotary unbalance of the part.

Another apparatus known in the prior art actually makes use of the brush holder. In this structure, the temperature-sensitive element is a thermocouple embedded in a brush of melamine asbestos which scrubs, or wipes, over the commutator surface. This brush of melamine asbestos is mounted in one of the regular brush holders in place of the carbon brush and uses the same brush pressure spring as the carbon brush it displaces. In order to obtain a reliable indication from such a device, it is necessary to mount the thermocouple very close to the end of the brush that scrubs the commutator, the distance from the thermocouple to the commutator being in the order of one-quarter inch for a new brush. Because of this circumstance, such a brush must be discarded after a small amount of wear has taken place, usually a wear of one-eighth inch. For a more complete understanding of the device our apparatus is to replace, reference may be had to the pending application of Charles C. Whittaker, Serial No. 733,380, filed March 8, 1947, now Patent No. 2,508,205, entitled Temperature Indicating Devices.

The structural features of our invention comprise a generally rectangular, relatively short sleeve 1. This sleeve is provided with a bracket 2 which fits slidably into the beam 3 arranged to be bolted to the frame of a dynamo-electric machine of which only a broken out portion 4 of the commutator is shown. Our apparatus is, in the particular application shown, utilized to determine the temperature of the commutator.

The bracket 2 is provided with the slots 5 through which bolts (not shown) may be disposed to fit into threaded openings in the beam 3. The sleeve 1 may thus be adjusted to hold a given distance from the commutator 4 and may also be so arranged that the sleeve axis is disposed radially of the commutator.

The sleeve 1 is provided with rectangular slots 5a in the front inner face so that the groove is disposed radially of the commutator when the parts are in assembled relation. The rear inner face is provided with a similar groove 6. These grooves do not extend over the full length of the sleeve but end at points 7 and 8. At the end of these grooves 5a and 6, the front inner face and the rear inner face are provided with rectangular grooves 9 and 10 normal to the grooves 5a and 6, respectively.

For the temperature-sensitive element, we utilized a thermistor 11. Other generally similar temperature responsive elements, as resistor, thermocouples, etc., may also be used. This thermistor 11 is mounted in the elongated generally rectangular block 12 of melamine asbestos. This block 12 is provided with the rectangular lugs 13 and 14. The grooves 5a and 6 are disposed so as not to be in the midposition of the faces of the sleeve. In assembling the block 12 into the sleeve, the block is moved into the sleeve 1 so that the lugs 13 and 14 radially traverse grooves 5a and 6, and, when the lugs arrive at the end of these grooves, the block 12 is moved along slots 9 and 10 to the position shown. The lugs 13 and 14 thus prevent the block 12 from moving toward the commutator. The spacing is such that the lower edge of the block is in use spaced from the commutator about one-sixteenth to one-thirty-second of an inch from the commutator. The thermistor is mounted in the lower edge of the block 12.

The special resistor or semi-conductor we use, and which in the trade is designated a thermistor, does not, in itself, constitute our invention, but a brief statement of the physical composition and physical and electrical characteristics of the thermistor will, no doubt, be helpful in understanding our invention.

Devices known in the trade as thermistors, are thermally sensitive resistors, and usually are built in small inexpensive units. As such units, they have the considerable advantage of providing a low-cost control device having manifold uses. The units comprise solid pieces of a material whose electrical resistance varies widely and rapidly with changes in temperature. In this respect, their distinction over other variable resistance materials is their extreme sensitivity to relatively minute thermal changes.

The thermistor materials are oxides of manganese, cobalt, nickel, copper, uranium, and a few other metals mixed and milled in selected proportions. Firing this mixture under carefully controlled conditions of temperature and atmosphere results in a hard ceramic-like semiconductor material whose conductivity lies between that of insulators and conductors.

This mixture of metal oxides of the metals mentioned results in a material having a negative temperature coefficient. The thermistor responds negatively to changes in temperature. A rise in temperature from a given value causes a drop in resistance and a decrease in temperature from the given value causes an increase in resistance.

The thermistor 11 has its opposite terminals connected to the terminals 15 and 16, and these terminals are, in turn, connected so as to form one leg of a Wheatstone bridge. The other legs are provided with resistors 17, 18 and 19. These resistors are selected to have zero, or at least a negligible, temperature coefficient. The supply terminals for electric energy are designated by 20 and 21. A meter 22 calibrated in temperature units is interconnected with the Wheatstone bridge and thus indicates the changes in temperature to which the thermistor 11 is subjected.

In order to make the thermistor respond more effectively to the temperature of the commutator, we mount a melamine asbestos brush 23 at one side of the block 12 and another brush 24 of the same material on the other side of the block 12. To provide that there be good heat conduction between the brushes 23 and 24 and the block 12, we mount a relatively stiff flat spring, or other type of spring, 25 between the inner sidewall of the sleeve 1 and brush 23. The brushes 23 and 24 and block 12 are thus firmly pressed together against the other inner side-wall of the sleeve 1. The pressure is such that the brushes 23 and 24 may nevertheless slide freely radially within the sleeve 1 and with reference to block 12.

To eliminate friction as much as possible, the ends of the flat spring are provided with rollers 50 and 51 that may rotate on horizontal axes parallel to the brush 23. A similar pair of friction reducing rollers 60 and 61 are mounted in the front or left-hand wall of the sleeve 1. The brushes 23 and 24 thus move freely vertically except for the relatively frictionless surface contact between the brush 23 and the block 12 and brush 24 and the block 12.

At the front of the sleeve 1, we mount a pair of parallel brackets 26 and 27 carrying the bearing pin 28. To this pin, a flat spiral spring 29 is rigidly secured. This spring has the curved upper end 29a carrying the cross-member 30 for contacting the outer ends of the brushes 23 and 24 to thus bias these brushes firmly against the commutator 4. Good heat conducting contact is thus provided between the commutator 4 and brushes 23 and 24, and the flat spring 25 insures that there is good heat conduction between brushes 23 and 24 and block 12.

The bearing pin 28 rotates freely in the brackets 26 and 27 so that the spring 29 may be caused to rotate. Since the brushes 23 and 24 scrub, or wipe, the commutator 4, their lower ends wear off. To compensate for this wear, we provide the left-hand face of the bracket with the rigidly mounted plate 31 having the hooks 32, 33, 34, 35 and 36. The bail 37 coupled to the bearing pin 28 may thus be shifted to engage any one of the hooks to thus change the spring force of the spring 29 and to compensate for the wear of the brushes 23 and 24.

Our invention, by the very nature of its construction, has a brush-life far greater than somewhat similar devices heretofore used. The permissible brush wear, in our invention, is in the order of two inches, making the useful life of our apparatus approximately sixteen times that of generally similar prior art devices.

While we have shown but one embodiment, we do not consider the embodiment shown as the only construction possible. Other modifications and arrangements are readily possible, all within the spirit of our invention.

We claim as our invention:

1. In a device for determining the temperature of a relatively hot body normally, when in use, moving with reference to a base, in combination, a base, a block of material, comprising an electrical insulator but having the property of being a good conductor of heat, mounted on the base so that one surface is in close, almost contacting relation to the body, means of similar material to the said block disposed on the base to contact the body and to be in good heat conducting relation to the block, a thermistor disposed in said block to thus be subject to the changes in temperature of the body, and electric circuit means including means for energizing said thermistor and meter means for indicating the changes in temperature of the body as sensed by the thermistor.

2. In a device for determining the temperature of a substance, in combination, a base disposed in proximity to said substance, a block of material having the property of being a good conductor of heat but a non-conductor of electric energy, a thermistor disposed in said block, mounting means for so mounting said block on said base that the termistor is near said substance but not in contact with said substance, heat conducting means substantially surrounding said block and being of material similar to said block and supported by said mounting means but being so supported that said heat conducting means are in contact with said substance to thus transmit the changes in temperature of the substance to said thermistor, and means for indicating the changes in resistance of said thermistor.

3. In a device for determining the temperature of a body, in combination, a base disposed in proximity to said body, a block of material having the properties of being an electrical insulator and a good conductor of heat, a thermistor disposed on said block, heat conducting means comprising two blocks of material of the same substance as said block carrying the thermistor, said heat conducting means being mounted on the base so that one heat conducting block contacts one face of the first-mentioned block and contacts the body and the other heat conducting block contacts the other face of the first-mentioned block and the body whereby changes in temperature of the body are transmitted to the thermistor, and means for indicating the changes in electrical resistance of the thermistor.

4. In a device for determining the temperature of a body which in normal use moves in relation to a base, in combination, a generally rectangular sleeve, three generally rectangular blocks of material that are good conductors of heat and non-conductors of electricity, disposed in parallel relation slidably in said sleeve, stop means on the sleeve for limiting the movement of the middle block so that its end is spaced from the body a relatively small fraction of its own thickness, spring means for actuating the two outer blocks to contact said body in slidable relation, spring means for causing said blocks to be firmly pressed against each other to thus transmit the heat collected from the body by the two outer blocks to the inner block, a thermistor disposed in said middle block, and meter means for indicating the changes in resistance of said thermistor with the changes in temperature of said body.

5. In a device for determining the temperature of a body which in normal use moves in relation to a base, in combination, a generally rectangular sleeve, three generally rectangular blocks of material that are good conductors of heat and non-conductors of electricity, disposed in parallel relation slidably in said sleeve, stop means on the sleeve for limiting the movement of the middle block so that its end is spaced from the body a relatively small fraction of its own thickness, spring means for actuating the two outer blocks to contact said body in slidable relation, spring means for causing said blocks to be firmly pressed against each other to thus transmit the heat collected from the body by the two outer blocks to the inner block, a thermistor disposed in said middle block, a pair of supply terminals of electric energy, a Wheatstone bridge circuit connected to said terminals, said thermistor being connected in one leg of said bridge circuit, and meter means for indicating the changes in resistance of said thermistor with the changes in temperature of said body.

6. In a device for measuring the temperature of the commutator of a dynamo-electric machine, in combination, a brush holder, including a rectangular sleeve, mounted in fixed relation on said machine, three melamine asbestos brushes, generally in the shape of commutator brushes, disposed in said sleeve in parallel contiguous relation to each other, stop means for holding the middle brush away from the commutator of said machine by a distance that is a relatively small fraction of the brush thickness, spring means for firmly pressing the brushes against each other so that there is good heat transfer from brush to brush, second spring means for pressing the two outer brushes firmly against the commutator to thus slide on the commutator and thus be kept at substantially the temperature of the commutator, a thermistor in the middle brush, and means for indicating the changes in resistance of said thermistor with changes in temperature.

7. In a device for measuring the temperature of the commutator of a dynamo-electric machine, in combination, a brush holder, including a rectangular sleeve, mounted in fixed relation on said machine, three melamine asbestos brushes, generally in the shape of commutator brushes, disposed in said sleeve in parallel contiguous relation to each other, stop means for holding the middle brush away from the commutator of said machine by a distance that is a relatively small fraction of the brush thickness, spring means for firmly pressing the brushes against each other so that there is good heat transfer from brush to brush, second spring means for pressing the two outer brushes firmly against the commutator to thus slide on the commutator and thus be kept at substantially the temperature of the commutator, a thermistor in the middle brush, a pair of supply terminals of electric energy, a Wheatstone bridge circuit connected to said terminals, said thermistor being connected in one leg of said bridge circuit, and means for indicating the changes in resistance of said thermistor with changes in temperature.

8. In a device for measuring the temperature of the commutator of a dynamo-electric machine, in combination, a brush holder, including sleeve means, mounted in fixed relation to said machine, melamine asbestos brush means comprising a plurality of slidable elements mounted in said sleeve means, one of said elements being so retained in the sleeve means to be out of contact with the commutator but mounted to be in good heat conducting relation to the other elements and the other elements being in contact with the commutator to thus transmit the heat of the commutator to the one element not in contact with the commutator, a thermistor on said element not in contact with the commutator, and means for indicating the resistance changes of the thermistor with changes in temperature.

9. In a device for measuring the temperature of the commutator of a dynamo-electric machine, in combination, a brush holder, including a rectangular sleeve, mounted on the machine frame so that the sleeve axis is disposed radially of the commutator of the machine, a pair of melamine asbestos bars generally in the shape of commutator brushes disposed slidably in said sleeve to contact the commutator, a third melamine asbestos bar shorter in a radial direction mounted in the sleeve between the two first-mentioned bars, stop means for holding the third bar a relatively small radial distance from the commutator, said bars being mounted in said rectangular sleeve to be in good heat conducting relation to each other, a thermistor mounted in the third bar, an electric circuit means including meter means connected to said thermistor for indicating the temperature of the commutator by reasons of the changes in resistance of the thermistor with changes in commutator temperature.

10. In a device for measuring the temperature of the commutator of a dynamo-electric machine, in combination, a brush holder, including a rectangular sleeve, mounted on the machine frame so that the sleeve axis is disposed radially of the commutator of the machine, a pair of melamine asbestos bars generally in the shape of commutator brushes disposed slidably in said sleeve to contact the commutator, a third melamine asbestos bar shorter in a radial direction mounted in the sleeve between the two first-mentioned bars, stop means for holding the third bar a relatively small radial distance from the commutator, spring means for biasing said three bars toward each other so that said bars are mounted in said rectangular sleeve to be in good heat conducting relation to each other, a thermistor mounted in the third bar, and electric circuit means including meter means connected to said thermistor for indicating the temperature of the commutator by reasons of the changes in resistance of the thermistor with changes in commutator temperature.

11. In a device for measuring the temperature of the commutator of a dynamo-electric machine, in combination, a brush holder, including a rectangular sleeve, mounted on the machine frame so that the sleeve axis is disposed radially of the commutator of the machine, a pair of melamine asbestos bars generally in the shape of commutator brushes disposed slidably in said sleeve to contact the commutator, a third melamine asbestos bar shorter in a radial direction mounted in the sleeve between the two first-mentioned bars, stop means for holding the third bar a relatively small radial distance from the commutator, said bars being mounted in said rectangular sleeve to be in good heat conducting relation to each other, radially acting spring means engaging the outer radial ends of the two outside bars to thus cause said bars to be firmly disposed against the commutator to wipe, or scrub, over said commutator to thus be in good heat conducting relation to the commutator, a thermistor mounted in the third bar, and electric circuit means including meter means connected to said thermistor for indicating the temperature of the commutator by reasons of the changes in resistance of the thermistor with changes in commutator temperature.

12. In a device for measuring the temperature of the commutator of a dynamo-electric machine, in combination, a brush holder, including a rectangular sleeve, mounted on the machine frame so that the sleeve axis is disposed radially of the commutator of the machine, a pair of melamine asbestos bars generally in the shape of commutator brushes disposed slidably in said sleeve to contact the commutator, a third melamine asbestos bar shorter in a radial direction mounted in the sleeve between the two first-mentioned bars, stop means for holding the third bar a relatively small radial distance from the commutator, said bars being mounted in said rectangular sleeve to be in good heat conducting relation to each other, radially acting spring means engaging the outer radial ends of the two outside bars to thus cause said bars to be firmly disposed against the commutator to wipe, or scrub, over said commutator to thus be in good heat conducting relation to the commutator, bar-wear compensating means for altering the position of said radially acting spring means to thus compensate for wear of said two outside bars, a thermistor mounted in the third bar, and electric circuit means including meter means connected to said thermistor for indicating the temperature of the commutator by reasons of the changes in resistance of the thermistor with changes in commutator temperature.

13. In a device for measuring the temperature of the commutator of a dynamo-electric machine, in combination, a brush holder, including a rectangular sleeve, mounted on the machine frame so that the sleeve axis is disposed radially of the commutator of the machine, a pair of melamine asbestos bars generally in the shape of commutator brushes disposed slidably in said sleeve to contact the commutator, a third melamine asbestos bar shorter in a radial direction mounted in the sleeve between the two first-mentioned bars, stop means for holding the third bar a relatively small radial distance from the commutator, spring means for biasing said three bars toward each other so that said bars are mounted in said rectangular sleeve to be in good heat conducting relation to each other, radially acting spring means engaging the outer radial ends of the two outside bars to thus cause said bars to be firmly disposed against the commutator to wipe, or scrub, over said commutator to thus be in good heat conducting relation to the commutator, bar-wear compensating means for altering the position of said radially acting spring means to thus compensate for wear of said two outside bars, a thermistor mounted in the third bar, and electric circuit means including meter means connected to said thermistor for indicating the temperature of the commutator by reasons of the changes in resistance of the thermistor with changes in commutator temperature.

14. In a device for determining the temperature of a relatively hot body normally, when in use, moving with reference to a base, in combination, a base, a block of material, comprising an electrical insulator but having the property of being a good conductor of heat, mounted on the base so that one surface is in close, almost contacting relation to the body, means of similar material to the said block disposed on the base to contact the body and to be in good heat conducting relation to the block, a temperature responsive member disposed on said block to thus be subject to the temperature changes of the body, electric circuit means including means for energizing said temperature responsive member, and an electric meter for indicating the changes in temperature of the body as sensed by the temperature responsive member.

15. In a device for determining the temperature of a body which in normal use moves in relation to a base, in combination, a generally rectangular sleeve, three generally rectangular blocks of material that are good conductors of heat and non-conductors of electricity, disposed in parallel relation slidably in said sleeve, stop means on the sleeve for limiting the movement of the middle block so that its end is spaced from the body a relatively small fraction of its own thickness, spring means for actuating the two outer blocks to contact said body in slidable relation, spring means for causing said blocks to be firmly pressed against each other to thus transmit the heat collected from the body by the two outer blocks to the inner block, a temperature sensitive electrical element disposed in the middle block, energized circuit means including said element, and electrical meter means for indicating the changes in characteristics of said element with changes in temperature.

16. In a device for measuring the temperature of the commutator of a dynamo-electric machine, in combination, a brush holder, including a rectangular sleeve, mounted in fixed relation on said machine, three melamine asbestos brushes, generally in the shape of commutator brushes, disposed in said sleeve in parallel contiguous relation to each other, stop means for holding the middle brush away from the commutator of said machine by a distance that is a relatively small fraction of the brush thickness, spring means for firmly pressing the brushes against each other so that there is good heat transfer from brush to brush, second spring means for pressing the two outer brushes firmly against the commutator to thus slide on the commutator and thus be kept at substantially the temperature of the commutator, a temperature sensitive electrical resistance element in the middle brush, and means for indicating the changes in resistance of said resistance element with changes in temperature.

17. In a device for measuring the temperature of the commutator of a dynamo-electric machine, in combination, a brush holder, including sleeve means, mounted in fixed relation to said machine, melamine asbestos brush means comprising a plurality of slidable elements mounted in said sleeve means, one of said elements being so retained in the sleeve means to be out of contact with the commutator but mounted to be in good heat conducting relation to the other elements and the other elements being in contact with the commutator to thus transmit the heat of the commutator to the one element not in contact with the commutator, a temperature sensitive electrical resistor on said element not in contact with the commutator, means for electrically energizing said resistor, and a meter for indicating the changes in resistance value of said resistor with changes in temperature.

WILLIAM A. KIRSCH.
JAMES G. WILHITE.

REFERENCES CITED

The following references are of record in the file of this patent:

UNITED STATES PATENTS

| Number | Name | Date |
| --- | --- | --- |
| 1,046,925 | Wilson | Dec. 10, 1912 |
| 1,220,635 | Hunter et al. | Mar. 27, 1917 |
| 1,717,849 | Maynard | June 18, 1929 |
| 1,907,540 | Hebler | May 9, 1933 |
| 2,480,703 | Brodner et al. | Aug. 30, 1949 |